United States Patent [19]
Greene

[11] 3,852,711
[45] Dec. 3, 1974

[54] ALTITUDE ALERTING INSTRUMENT

[75] Inventor: Leonard M. Greene, Chappaqua, N.Y.

[73] Assignee: Safe Flight Instrument Corporation, White Plains, N.Y.

[22] Filed: Nov. 21, 1972

[21] Appl. No.: 308,568

Related U.S. Application Data

[63] Continuation-in-part of Ser. No. 204,052, Dec. 2, 1971, abandoned.

[52] U.S. Cl. .................................. 340/27 R, 73/387
[51] Int. Cl. .............................................. G08g 5/00
[58] Field of Search......... 340/27 R, 27 AT, 27 NA, 340/25; 73/178 T, 384, 387

[56] References Cited
UNITED STATES PATENTS

| | | |
|---|---|---|
| 3,478,310 | 11/1969 | Cone, Jr. .......................... 340/27 NA |
| 3,537,086 | 10/1970 | Andresen, Jr. ..................... 340/27 R |
| 3,685,360 | 8/1972 | Raznov ................................ 73/387 |
| 3,735,341 | 5/1973 | Hedrick ........................... 340/27 R |

*Primary Examiner*—Felix D. Gruber
*Assistant Examiner*—Jerry Smith

[57] ABSTRACT

An aircraft altitude alerting instrument. The instrument includes a pressure reference scale and an altitude alerting scale. Means is provided for placing a selected altitude alerting setting on the altitude scale adjacent to a pressure reference reading on the pressure reference scale. The pressure reference reading on the pressure reference scale provides an index for the selected altitude alerting setting. Means responsive to measured static pressure outside the aircraft and coupled to the altitude setting means is provided for activating a warning signal device.

10 Claims, 4 Drawing Figures

PATENTED DEC 3 1974　　　　　　　　　　　3,852,711

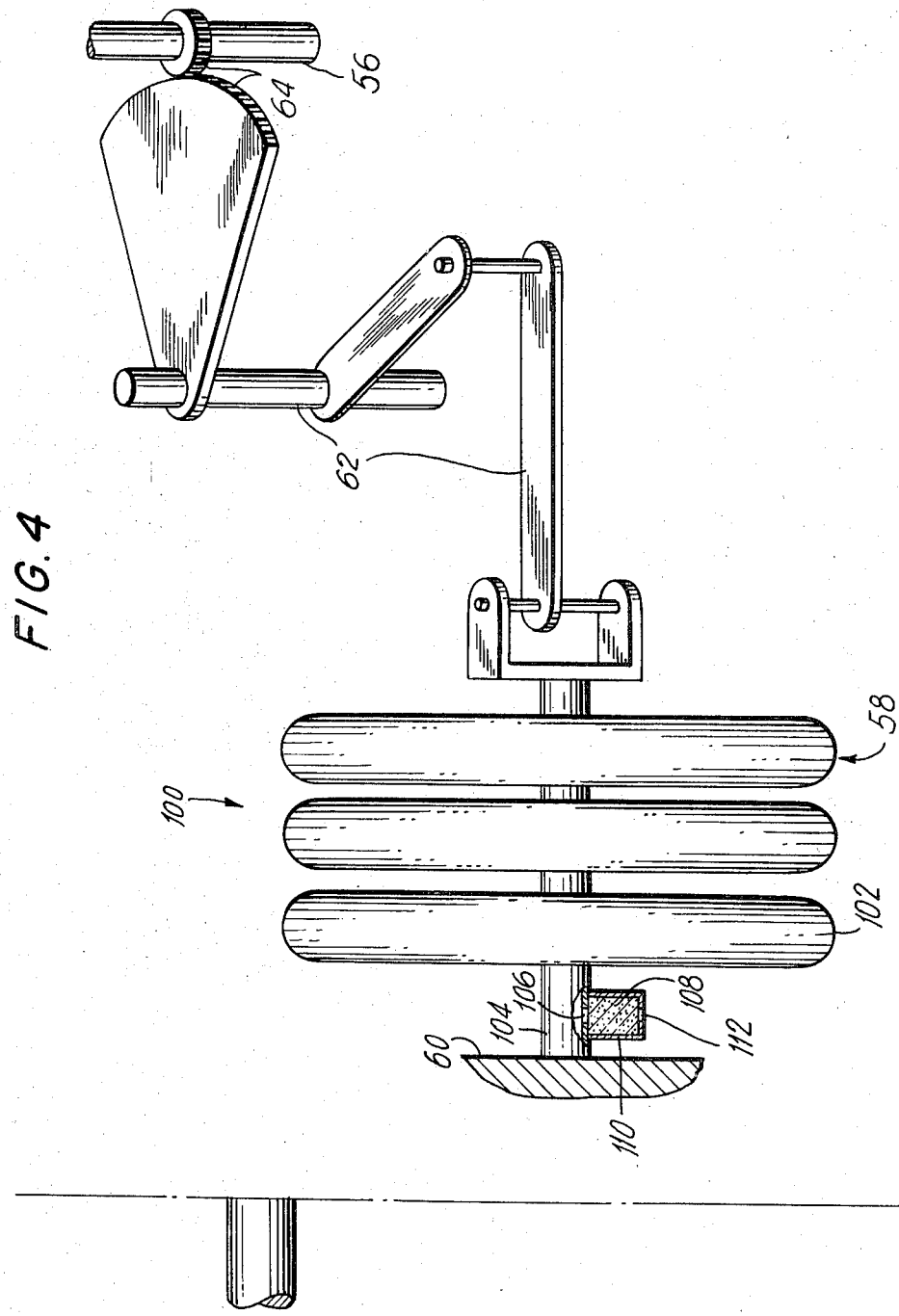

3,852,711

ALTITUDE ALERTING INSTRUMENT

CROSS REFERENCE TO RELATED APPLICATIONS

This application is a continuation-in-part of my copending patent application Ser. No. 204,052, filed Dec. 2, 1971, for "Altitude Alerting Instrument" and now abandoned.

BACKGROUND OF THE INVENTION

1. Field of the Invention

Aircraft altitude alerting instruments

2. Description of the Prior Art

Present altitude alerting instruments are either separate instruments or are made part of altimeter equipment. In either case, the altitude alert setting is made by first obtaining a sea level pressure reading from a control tower, then adjusting the instrument to the pressure reading, and then selecting the altitude setting upon which the instrument will activate a warning device. Since the control for adjusting the instrument to sea level pressure is either not located upon the face of the altitude alerting instrument or is located on the altitude alerting instrument but placed apart from an altitude setting dial, there is a tendency to set the altitude setting dial to the desired altitude alerting setting without also adjusting the instrument to reference sea level pressure, thereby subjecting the instrument to a false reading.

With the speed of modern aircraft, very frequently it is important for a pilot to know when he is approaching a desired altitude in addition to knowing his specific altitude. As an example, if a pilot wishes to level a climbing aircraft at a particular altitude, he must take corrective action prior to reaching that altitude. Here, too, care must be taken to ensure that the sea level reference pressure is considered.

SUMMARY OF THE INVENTION

1. Purposes of the Invention

It is an object of this invention to provide an improved altitude alerting instrument.

It is a further object of this invention to provide an aircraft altitude alerting instrument which greatly simplifies for an aircraft pilot the use of sea level pressure as a reference when setting the desired altitude alert point.

Another object of the present invention is to provide an aircraft altitude alerting instrument of the character described which provides a signal warning of the approach to a particular altitude.

Other objects of the invention in part will be obvious and in part will be pointed out hereinafter.

2. Brief Description of the Invention

According to a broad aspect of one embodiment of the invention, there is provided an aircraft altitude alerting instrument comprising a pressure reference element, an altitude alerting scale and means for placing a selected altitude alerting setting on said altitude scale adjacent a pressure reference reading on said pressure reference element. The pressure reference reading provides an index for the selected altitude alerting setting. Means responsive to static pressure outside the aircraft and coupled to said altitude setting means is provided for activating a warning signal device.

In another embodiment of the invention additional means is provided which is responsive to the rate of climb of the aircraft to the selected altitude to activate the warning signal device prior to the aircraft reaching the selected altitude.

The invention accordingly consists in the features of construction, combination of elements, and arrangement of parts which will be exemplified in the altitude alerting instruments hereinafter described and of which the scope of application will be indicated in the appended claims.

BRIEF DESCRIPTION OF THE DRAWINGS

In the drawings:

FIG. 4 is a fragmentary perspective view of components of a second embodiment of the present invention.

DESCRIPTION OF THE PREFERRED EMBODIMENTS

Figure 1:
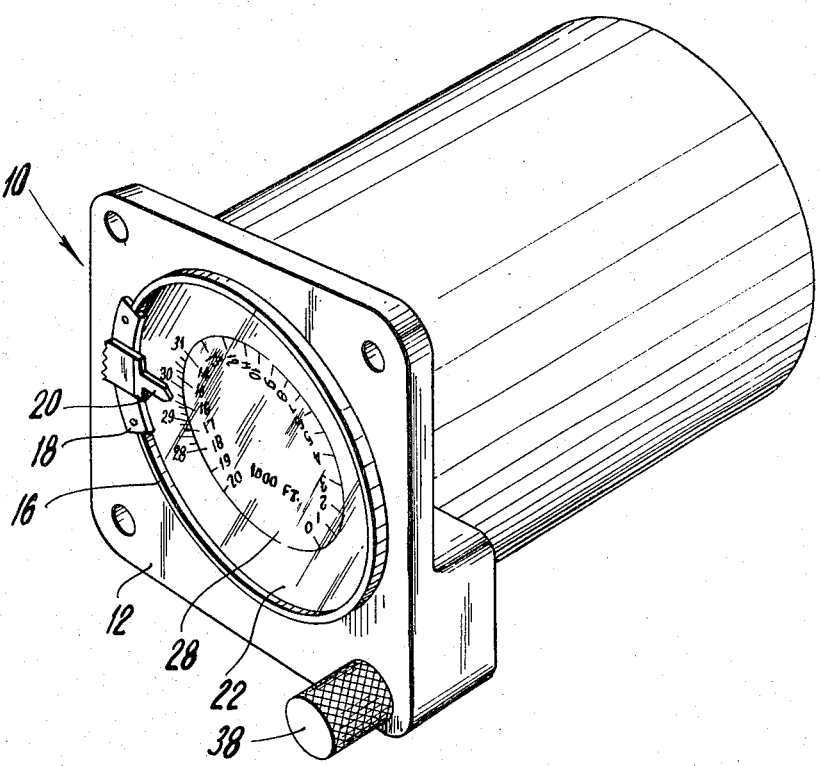
FIG. 1 is a perspective view of the altitude alerting instrument of a first embodiment of the present invention.

The altitude alerting instrument 10 shown in FIG. 1 is adapted to be mounted on the instrument panel of an aircraft. The housing for instrument 10 is made of any suitable metal or of plastic.

Figure 2:
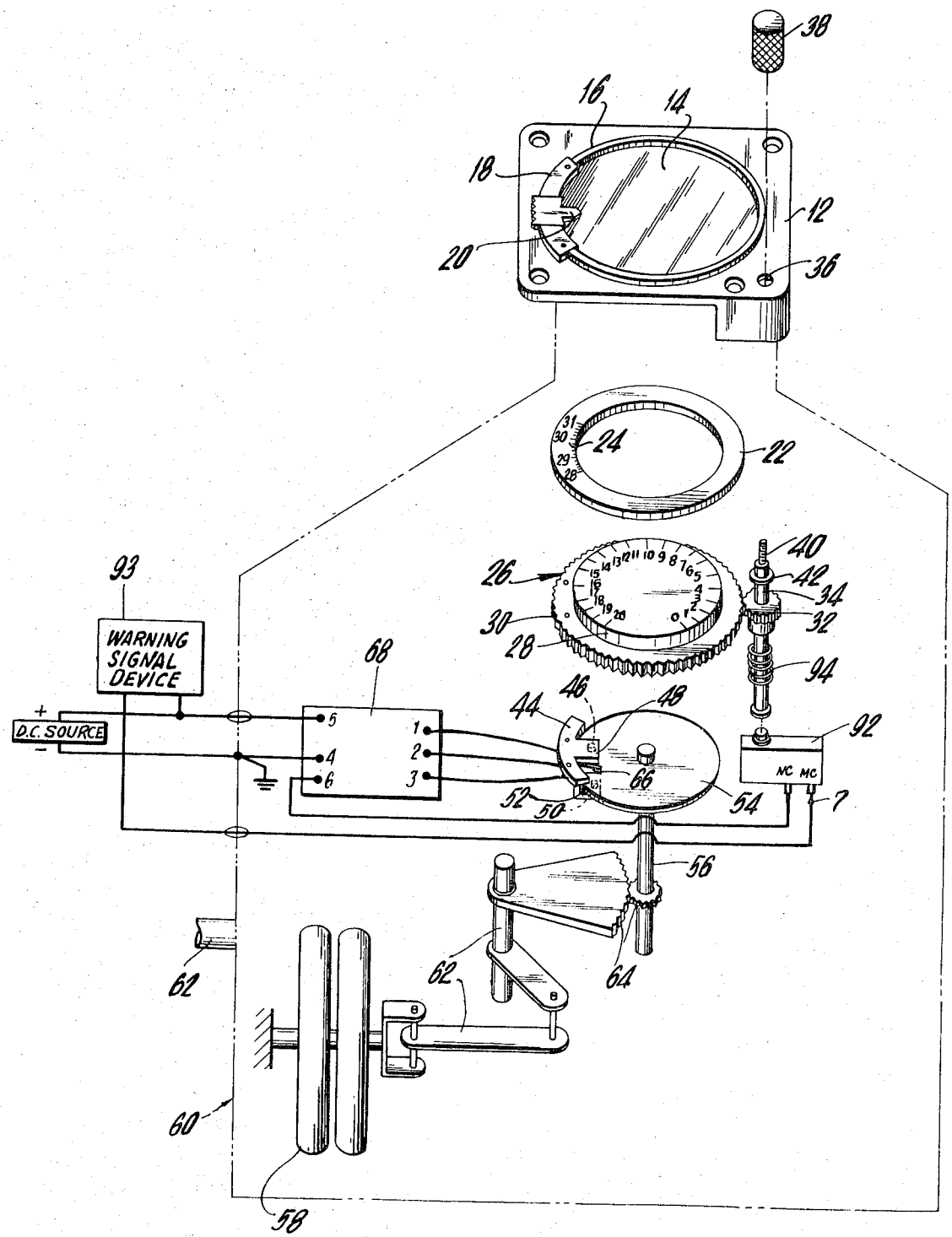
FIG. 2 is an exploded perspective view of the components of the altitude alerting instrument shown in FIG. 1.

As shown in FIG. 2, the front face 12 of instrument 10 has a glass or transparent window 14 centered therein. The periphery of window 14 is sealed in an opening in the front face, said opening having a rail 16 formed along the circumference thereof. A portion 18 of rail 16 is shaped to receive an index marker 20 for captive slideable movement therealong. Marker 20 is large enough to be readily observable by the eye, and desirably has a distinctive color, such as red. Set behind window 12 is a stationary pressure reference ring 22 having on the face thereof an arcuate scale 24 of markings extending alongside portion 18 of rail 16 so that by sliding marker 20 it can be indexed to any selected marking on scale 24 within a pressure reading range of 28 to 31 inches of mercury. Scale 24 is located along the inner circumference of reference ring 22 so as to be visible through window 14.

An altitude setting dial 26 is provided with a raised central plateau 28 having a peripheral scale of altitude markings on the face thereof. In the illustrated example, the altitude markings range from 0 to 20, each marking being a one thousand foot multiple so as to give the scale a range of approximately 0 to 20 thousand feet. Plateau 28 of altitude setting dial 26 fits snugly within the inner circumference of pressure reference ring 22 so that its altitude markings are also clearly visible through window 14. The height of plateau 28 is such that its face and the markings thereon are coplanar with the face of the ring. The dial 26 has a depressed flange 30 with gear teeth along the circumference thereof. Said teeth are adapted to mesh with the teeth of a pinion 32. Pinion 32 is attached to a shaft 34 which extends through a hole 36 in front face 12. A knob 38 is attached to the outer end 40 of shaft 34, and shaft 34 is provided with a shaft seal 42.

A curved bracket 44 is attached to flange 30 of altitude reference dial 26 for movement therewith. Bracket 44 has a light emitting diode 46 fixed to the bottom surface of a radially inwardly extending leg 48 thereof, and has a photo-sensitive transistor 50 mounted on a top surface of another radially inwardly extending leg 52 thereof. Leg 52 is below, parallel to and spaced from leg 48. Transistor 50 is reasonably aligned with and close to light emitting diode 46 so that when light emitting diode 46 is activated and no opaque element is interposed therebetween, the light emitted therefrom is sufficient to turn on transistor 50.

Means coupled to an opaque disc 54 via a shaft 56 responsive to changes in local static pressure, i.e., the static pressure in the vicinity of the aircraft carrying instrument 10, is provided by an evacuated aneroid capsule assembly 58 mounted on a housing 60 for instrument 10. A tube 61 connects the interior of housing 60 to the local static atmosphere so that the static pressure at the altitude of the aircraft is sensed within housing 60. Linkages 62 and a gear train 64 couple assembly 58 to shaft 56 in such fashion that a change in static pressure turns shaft 56. Due to its pressure differential construction, assembly 58 expands as the pressure within the housing is reduced, and contracts as the pressure within the housing increases. Disc 54 rotates in either direction corresponding to changes in altitude as assembly 58 expands and contracts.

Disc 54 is located between and spaced from diode 46 and transistor 50 and has a circumferentially narrow aperture 66 near one edge thereof whereby disc 54 acts as a shutter for the light emitted from light emitting diode 46 so that photo transistor 50 turns on only when aperture 66 is aligned with diode 46 and transistor 50. Light emitting diode 46 and transistor 50 are part of a signal generating circuit shown schematically in FIG. 3 that is electrically connected to box 68 (shown in FIG. 2) which houses the remainder of the signal generating circuit.

Figure 3:
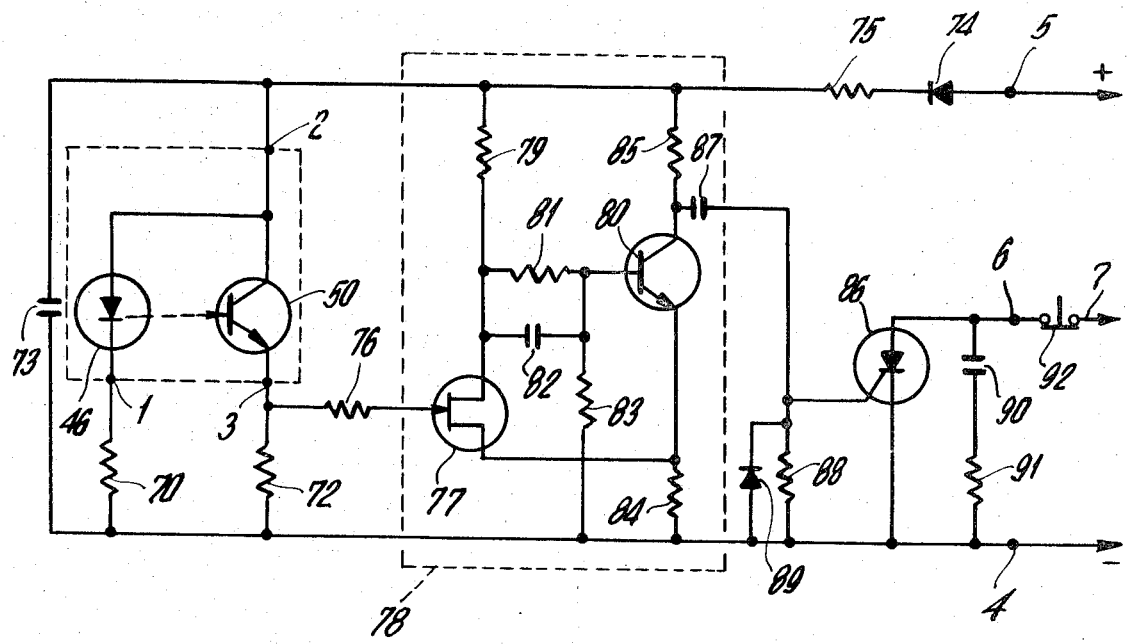
FIG. 3 is a schematic diagram of the signal generating circuit for activating a warning signal device.

As shown in FIG. 3, the anode of light emitting diode 46 and the collector of N-P-N photo-sensitive transistor 50 are electrically connected to terminal 2 of box 68, while the cathode of diode 46 and the emitter of transistor 50 are respectively connected to terminals 1 and 3 of box 68. Terminal 1 is electrically coupled to negative DC terminal 4 on box 68 via a resistor 70, while terminal 3 is electrically coupled to negative DC terminal 4 via resistor 72. A capacitor 73 is placed between terminals 2 and 4 to protect the active components from sudden voltage variations. Terminal 2 on box 68 is electrically coupled to positive DC terminal 5 on box 68 via diode 74 and resistor 75. The emitter of transistor 50 is electrically coupled via a resistor 76 to a gate terminal of a field effect transistor 77, which gate terminal is the input of a Schmidt trigger circuit 78. The drain terminal of transistor 77 is electrically coupled to resistor 75 via resistor 79, and is also electrically coupled to the base terminal of N-P-N transistor 80 via a parallel combination of resistor 81 and capacitor 82. The base terminal of transistor 80 is electrically coupled to negative DC terminal 4 via resistor 83. The source terminal of transistor 77 and the emitter of transistor 80 are electrically coupled to negative DC terminal 4 via a resistor 84. The collector of transistor 80 is coupled to resistor 75 via a resistor 85. The output of Schmidt trigger circuit 78 is fed from the collector of transistor 80 to a gate terminal of a silicon controlled rectifier 86 via a capacitor 87. The gate terminal of silicon controlled rectifier 86 is coupled to negative DC terminal 4 via the parallel combination of a resistor 88 and a diode 89. The cathode of silicon controlled rectifier 86 is electrically connected to negative DC terminal 4 while the anode of silicon controlled rectifier 86 is electrically connected to terminal 6 of box 68. A series combination of a capacitor 90 and a resistor 91 are connected between terminals 4 and 6. A normally closed reset switch 92 is connected between terminal 6 and a terminal 7 on switch 92.

A warning signal device 93, which may or may not be located within instrument 10, is electrically connected between terminals 5 and 7. The warning device 93 (shown in FIG. 2) can be an audio type device such as a buzzer or it can be a visual type device such as a flashing colored light. It should be noted that reset switch 92 is mechanically linked to shaft 34 shown in FIG. 2. Shaft 34 is spring loaded by a compression spring 94 in such a manner that reset switch 92 will open up when shaft 34 is depressed by pushing down on knob 38 and then returns to its idle position with switch 92 closed when pressure is removed.

To use instrument 10 the aircraft pilot obtains advice of prevailing sea level pressure from a weather station or control tower. He then moves index marker 20 until it is pointing to a marking corresponding to the obtained sea level pressure on ring 22. He now turns knob 38 until the selected altitude dial marking is aligned with marker 20. In this manner he has adjusted the instrument to have a selected altitude alerting setting which is referenced to the prevailing sea level pressure. Thus, the operation of this instrument encourages the pilot not to set the instrument for a particular altitude alert setting without the instrument having previously been referenced to the prevailing sea level pressures. Aperture 66 in disc 54, diode 46 and photo-sensitive transistor 50 are so positioned in relation to the altitude markings on the face of plateau 28 of altitude dial 26, that the alignment of aperture 66, diode 46 and photo transistor 50 will always occur at the altitude indicated by index marker 20, provided, of course, that index marker 20 is also indexed to the correct sea level pressure. In the instrument being described, aperture 66 is of such a width as to give the altitude alerting instrument an accuracy of approximately ± 200 feet of the exact altitude alert setting. The static pressure, which corresponds to the desired altitude alert setting, forces assembly 58 to move linkages 62 and gear train 64 so that disc 54 rotates until aperture 66 aligns with light emitting diode 46 and transistor 50. When this alignment occurs, transistor 50 begins to turn on and conduct current, and starts to turn on field effect transistor 77 of Schmidt trigger circuit 78. As soon as field effect transistor 77 draws sufficient current, transistor 80, which was previously on, turns off and the voltage at the collector of transistor 80 rises to full positive DC voltage. The step rise in voltage at the collector of transistor 80 is differentiated by capacitor 87 and resistor 88 so that a positive spike appears at the gate of silicon control rectifier 86, whereupon silicon control rectifier 86 turns on and allows current to flow to warning signal device 93, thereby making known to the pilot of the aircraft that the altitude alert setting of the altitude alerting instrument has been reached.

By depressing knob 38 until shaft 34 opens reset switch 92, silicon control rectifier 86 is turned off so as to cancel the signal from the warning signal device. While the aircraft remains within the altitude range such that aperture 66 in disc 54 still passes light emitted from diode 46 to keep transistor 50 sufficiently on, the Schmidt trigger circuit is not reset and will not refire the silicon controlled rectifier. However, once the aircraft sufficiently deviates from the altitude alert setting (more than 200 feet in this instance) so that transistor 50 turns off, field effect transistor 77 turns off and transistor 80 turns on, thus causing a drop in voltage at the collector of transistor 80 so that Schmidt trigger circuit 78 is reset. Now if the aircraft re-enters the altitude alert setting range again, warning signal device 93 will be activated.

It should be noted that, since negative DC terminal 4 is grounded, terminal 7 is connected to circuit ground when silicon controlled rectifier 86 is turned on, so as to allow current to flow from positive DC terminal 5, through warning signal device 93 and silicon controlled rectifier 86, to negative DC terminal 4.

In FIG. 4 of the drawings a further aircraft alerting instrument 100 is partially illustrated, the same being identical insofar as structure is concerned to the embodiment set forth in FIGS. 1 through 3 except as hereinafter described. Like parts in both embodiments of the present invention are identified by the same reference numerals.

As will be apparent to those skilled in the art, in many instances it is desirable not only to know when a particular altitude is reached but also to know when the particular altitude rapidly is being approached. This is especially important for aircraft which are climbing or descending and are to level off at the particular altitude. In order for a climbing or descending aircraft to level off at the particular altitude, it is necessary for corrective action to be taken prior to the aircraft reaching said altitude.

In instrument 100 a vented aneroid bellows 102 is connected in series with assembly 58 so that the linear expansion or contraction of the aneroid bellows and of the assembly 58 is additive. A rigid hollow tube 104 communicates with the interior of aneroid bellows 102 and is anchored to housing 60. An orifice 106 extends through a wall of tube 104.

A porous material 108 overlays orifice 106 to limit the flow of air into tube 104 through said orifice and from tube 104 through said orifice. Porous material 108 is located in a housing 110 which is affixed to tube 104. Housing 110 includes an orifice 112 with porous material 108 filling the housing between orifice 112 and orifice 106.

Assembly 58 is connected to linkage 62 as described above and the remaining structure of the FIG. 4 embodiment is identical to that disclosed in the first embodiment of the present invention. It is to be appreciated that FIG. 4 discloses only a portion of embodiment 100 in order to avoid needless duplication.

In using the second embodiment of the present invention an aircraft pilot obtains a prevailing sea level pressure reading from a weather station or control tower. Index marker 20 is then moved until it is pointing to the obtained sea level pressure reading on ring 22. The pilot then rotates knob 38 until a selected altitude dial setting is aligned with marker 20.

Since corrective action is required prior to reaching the selected altitude, the pilot will be warned of the approach thereto. The rate of climb of the aircraft and the altitude thereof will determine when warning signal device 93 is activated. As the aircraft is climbing, the pressure inside housing 60 correspondingly drops. Assembly 58 expands with the reduction of pressure in housing 60. The reduction of pressure in housing 60 also results in the expansion of aneroid bellows 102. The rate of expansion of aneroid bellows 102 is a function of the rate of change of pressure in housing 60 (this being a function of the change of altitude). For rapid increases in altitude, the aneroid bellows will expand greater amounts than for less rapid increases in altitude. The precise expansion of bellows 102, aside from being a function of the change of pressure in housing 60, depends on the size of orifices 106 and 112 and the rate of flow of air through the porous material 108 and the length of the path of travel of air through the porous material. Orifices 106 and 112 and porous material 108 control the flow of air between the interior of aneroid bellows 102 and housing 60. If there is no resistance to the flow of air between housing 60 and the interior of aneroid bellows 102, the bellows will never expand since the pressure inside the bellows and in housing 60 will be the same. On the other hand, if the orifices and porous material prevent the pressure in the bellows interior and the pressure in housing 60 from immediately equalizing during changes in the aircraft altitude, there will be a pressure differential therebetween and the bellows will expand or contract depending upon whether the pressure is greater in housing 60 or within the bellows. When the aircraft is climbing, the pressure in the bellows is greater than the pressure in housing 60 as orifices 106 and 112 and porous material 108 prevent immediate equalization of said pressure. Bellows 102 accordingly expands.

As a consequence of the expansion of bellows 102, shaft 56 will be rotated an additional amount determined by the expansion of the bellows from that amount of rotation provided by assembly 58. As a result, warning signal device 93 will be activated prior to the aircraft reaching the selected altitude. For very slow changes in the rate of climb or descent, the pressure in bellows 102 and housing 60 will be the same and the bellows will not effect the activation of warning signal device 93.

Warning signal device 93 will stay activated until reset switch 92 is opened. If the aircraft levels off at the selected altitude, the aperture in disc 54 will stay aligned with light transmitting diode 46. This is because with the aircraft flying at a constant altitude the pressure inside bellows 102 and housing 60 will be equal and the bellows will be in its unexpanded condition while assembly 58 will have expanded to a position which corresponds to the selected altitude and causes the aperture in disc 54 to be aligned with light transmitting diode 46.

The instrument of the second embodiment of the present invention should alert the pilot of his approach to a selected altitude so there is sufficient time that once the pilot has been alerted normal corrective action to the flight of the aircraft will enable the pilot to level the aircraft at the selected altitude. In order to provide for this, the sizes of orifices 106 and 112 and the length and type of the porous material therebetween are so chosen that a proper rate term is introduced into the system.

If desired, instead of using a vented aneroid bellows a diaphragm unit may be used which is vented as aforedescribed. Also, instead of using orifices and porous material, capillary tubes having porous material therein and providing the only means of communication between tube 104 and housing 60 may be used.

It thus will be seen that there are provided altitude alerting instruments which achieve the various objects of the invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the invention there is claimed as new and desired to be secured by Letters Patent:

1. An aircraft altitude alerting instrument settable in accordance with a prevailing sea level pressure reference, said instrument comprising a stationary pressure reference element having thereon a scale of pressure markings, a pressure reference marker, means mounting said pressure reference marker for manual movement relative to said stationary pressure reference element, said pressure reference marker being adjacent to said stationary pressure reference element, an altitude setting element movable relative to said pressure reference element and being adjacent thereto and adjacent to said pressure reference marker, said altitude setting element including a scale of altitude markings thereon, means for manually moving said altitude setting element so that a selected altitude reading thereon is immediately adjacent said pressure reference marker whereby said pressure reference marker can be moved to a pressure marking on said pressure reference element which corresponds to a prevailing sea level pressure and said altitude setting element can then be moved by said moving means so that a selected altitude on said altitude setting element is adjacent said pressure reference marker, a warning signal device, and means responsive to the static pressure outside the aircraft and coupled to said altitude setting element moving means for activating said warning signal device.

2. An instrument according to claim 1 wherein said moving means includes a shaft mechanically coupled to said altitude setting element, a reset switch which when activated deactivates the warning signal, wherein the shaft is mounted for axially shiftable movement and said shaft is spring loaded and is mechanically coupled to said reset switch to open said reset switch by being shifted.

3. An instrument according to claim 1 wherein said scale of altitude markings is longer than said scale of pressure markings.

4. An instrument according to claim 1 wherein said responsive means includes an opaque disc having an aperture therein, means coupled to said disc for rotating said disc in response to the static pressure outside the aircraft, and a signal generating circuit including a first light-emitting electrical component and second light-sensitive electrical component, said electrical components being mechanically coupled to said setting means.

5. An instrument according to claim 4 wherein said first component is a light-emitting diode and said second component is a photo-sensitive transistor, said diode being separated from said photo-sensitive transistor by said disc until the aperture in said disc is aligned with said light-emitting diode and said photo-sensitive transistor whereupon the emitted light from said diode activates said photo-sensitive transistor and said activated photo-sensitive transistor triggers said signal generating circuit.

6. An instrument according to claim 5 wherein said signal generating circuit further includes a Schmidt trigger circuit coupled to said photo-sensitive transistor and a silicon controlled rectifier having a control electrode coupled to the output of said Schmidt trigger circuit whereby upon the triggering of the Schmidt trigger circuit by said photo-sensitive transistor said silicon controlled rectifier turns on, thereby initiating the warning signal.

7. An instrument according to claim 5 wherein said signal generating means includes circuit means coupled to said photo-sensitive transistor for producing a single pulse upon said photo-sensitive transistor sensing light from said diode, a silicon controlled rectifier having a control electrode coupled to the output of said circuit means whereby upon said photo-sensitive transistor sensing light from said diode said silicon controlled rectifier turns on thereby initiating the warning system.

8. An instrument according to claim 1 wherein said responsive means further includes means sensitive to the rate of change of static pressure outside the aircraft.

9. An instrument according to claim 8 wherein said means responsive to the static pressure outside the aircraft includes a first differential pressure responsive means having a first area and a second area and which expands and contracts as a function of the difference in pressure acting on the first and second areas thereof, said means sensitive to the rate of change of static pressure outside the aircraft including a second pressure responsive means having a first area and a second area and which expands and contracts as a function of the difference in pressure acting on the first and second areas thereof, said first and second pressure responsive means being arranged so that the expansion of each of said pressure responsive means is additive and the contraction of each of said pressure responsive means is additive, means for maintaining the first area of said first pressure responsive means at a pressure equal to the static pressure outside the aircraft and the second area thereof at a fixed pressure, and means for maintaining the first area of said second pressure responsive means at a pressure equal to the static pressure outside the aircraft and communicating the second area thereof to said first area of said second pressure responsive means.

10. An instrument according to claim 9 wherein said second pressure responsive maintaining means includes means for inhibiting the flow of air between the two areas of said second pressure responsive means.

* * * * *